United States Patent

Thompson

[11] 3,864,379
[45] Feb. 4, 1975

[54] ADDITION POLYMERS WITH POLYETHYLENIMINE TERMINAL GROUPS

[75] Inventor: Darrell R. Thompson, Somerville, N.J.

[73] Assignee: E. I. du Pont de Nemours and Company, Wilmington, Del.

[22] Filed: Apr. 5, 1972

[21] Appl. No.: 241,400

Related U.S. Application Data

[63] Continuation-in-part of Ser. No. 776,751, Nov. 18, 1968, abandoned.

[52] U.S. Cl........ 260/465.4, 260/47 R, 260/67.6 R, 260/70 R, 260/70 M, 260/465 D, 260/471 C, 260/482 R, 260/553 R, 260/570.5 P, 260/570.8 R, 260/583 R, 260/583 G, 260/583 H, 260/583 P, 260/584 R, 260/584 A
[51] Int. Cl.................. C07c 121/34, C07c 121/42
[58] Field of Search.......... 260/465.4, 465.5, 465 D, 260/465 E

[56] References Cited
UNITED STATES PATENTS
3,465,036   9/1969   Dundon et al............... 260/465.4 X Primary Examiner—Joseph P. Brust

[57] ABSTRACT

Polymers represented by the general structure

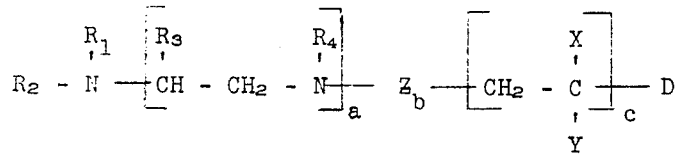

where
$R_1$, $R_2$ and $R_4$ can be hydrogen, alkyl radicals of one through four carbon atoms, $-CH_2CH_2NH_2$ radicals, or $-CH_2CH_2OH$ radicals;
$R_3$ and $X$ can be hydrogen or alkyl radicals of one through four carbon atoms;
$Z_b$ can be an organic linking radical;
$Y$ can be hydrogen, an alkyl radical of one through four carbon atoms, an alkenyl radical of two through six carbon atoms, $-CN$, halogen, phenyl, $-OR$,

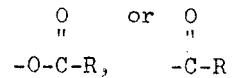

where
$R$ is an alkyl radical of one through 18 carbon atoms;
$D$ is an end group such as hydrogen, alkyl or alkenyl;
$a$ is a number 1 through 2000;
$b$ is 0 or 1;
and
$c$ is a number 5 through 5000;
the $c/a$ quotient being greater than 1.

9 Claims, No Drawings

ADDITION POLYMERS WITH POLYETHYLENIMINE TERMINAL GROUPS

CROSS-REFERENCE TO RELATED APPLICATIONS

This application is a continuation-in-part of Ser. No. 776,751, filed Nov. 18, 1968 and now abandoned.

STATEMENT OF THE INVENTION

This invention relates to addition polymers. It is more particularly directed to addition polymers represented by the structure (1) 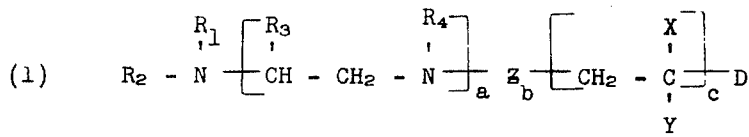

where
- $R_1$, $R_2$ and $R_4$ can be hydrogen, alkyl radicals of 1 through 4 carbon atoms, $-CH_2CH_2NH_2$ radicals or $-CH_2CH_2OH$ radicals;
- $R_3$ and $X$ can be hydrogen or alkyl radicals of 1 through 4 carbon atoms;
- $Z_b$ can be organic linking radical;
- $Y$ can be hydrogen, an alkyl radical of 1 through 4 carbon atoms, an alkenyl radical of 2 through 6 carbon atoms, $-CN$, halogen, phenyl, $-OR$,

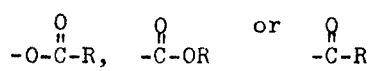

where
- $R$ is an alkyl radical of one through 18 carbon atoms;
- $D$ is an end group such as hydrogen, alkyl or alkenyl;
- $a$ is a number 1 through 2,000;
- $b$ is 0 or 1;
and
- $c$ is a number 5 through 5000;
the $c/a$ quotient being greater than 1.

UTILITY

The polymers of the invention are useful as film-formers in coating compositions, particularly when combined with a second polymer having complementary reactive groups. Illustrative of such second polymers are heat-reactive phenolics, polyglycidyl ethers and esters, polyisocyanate resins, butylated urea/formaldehyde resins and melamine formaldehyde/alkanol resins.

The polymers of the invention can be used as film-formers by mixing from about 55 to about 95 parts of the polymer with from about 5 to 45 parts of the second complementary polymer, in a suitable solvent. This solution can then be used directly to give clear coatings, or it may be pigmented as desired.

The coating composition can be applied conventionally and preferably is then baked for from about 10 to 30 minutes at 80°–200° C.

The polymers of the invention are also useful as aids for dispersing solid particles in organic liquids. They are especially useful as aids for dispersing pigments in organic liquids. Illustrative of the pigments which can be dispersed are titanium dioxide, carbon black, zinc oxide, lead titanate, potassium titanate, antimony oxide, lithopone, phthalocyanine blue, toluidine red, quiinacridone and the like.

Pigment dispersions made with polymers of the invention are remarkably resistant to flocculation, which gives the paints into which the dispersions are incorporated higher initial gloss, better hiding and tinting strength, and makes them resistant to color drift and gloss loss. These pigment dispersions can also be used satisfactorily with many more diverse types of paints than conventional pigment dispersions. Moreover, a dispersion made with a polymer of the invention can have a significantly higher pigment content, while retaining the same degree of fluidity, than when conventional aids are used.

The polymers of the invention can be used as pigment dispersing aids by dissolving from 0.001 to about 2.00 grams of polymer per square meter (Measured by the Brunauer, Emmett and Teller nitrogen adsorption method described on page 30 of "Colloidal Dispersions" by Earl K. Fischer, published by John Wiley and Sons in 1950.) of surface area of the pigment to be used, preferably 0.004 to about 0.100 gram per square meter, in an organic liquid compatible with the paint into which the pigment dispersion is to be incorporated. Illustrative of organic liquids which can be used are aliphatic and aromatic hydrocarbons, ethers, esters, ketones, alcohols, and mixtures of these.

An appropriate amount of pigment is then added to this solution, which is then subjected to shear, as by sand-grinding or ball-milling, to deagglomerate and disperse the pigment. This pigment dispersion or mill-base can be then added directly to a paint.

Polymers of the invention preferred for use as pigment dispersing aids are those of formula (1) where $a$ is 3 through 100 and $c$ is 20 through 500. Especially preferred are those whose preparation is shown in the Examples.

PREPARATION OF THE POLYMERS

Preparation of the polymers of the invention can be more easily described if it is first explained that structurally the polymer molecule divides itself naturally into two or three segments.

The first of these, the

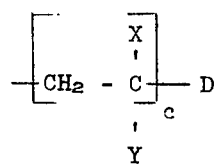

segment, is derived from an addition polymer or copolymer.

The second, the $-Z_b-$ segment, is an organic linking radical (which may be absent) which serves only to link the other two segments of the molecule together.

The third, the

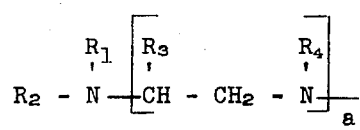

segment, is derived from a polyethylenimine.

The precursors to these segments are separately prepared and then linked together by reacting them under apropriate conditions to form the polymers of the invention.

A. Preparation of the Addition Polymer

This precursor can be prepared by polymerizing one or more of such monoethylenically unsaturated monomers as esters of acrylic- or methacrylic acids with alkanols of one through 18 carbon atoms, acrylonitrile, methacrylonitrile, vinyl esters such as vinyl acetate, vinyl chloride, vinyl fluoride, vinyl ethers, ethylene, propylene, isobutylene, styrene and methyl vinyl ketone. Diene monomers such as butadienes, chloroprene and isoprene can also be used.

Because the precursor segments are separately prepared and then chemically linked together, the addition polymer must bear a functional group which can react with either the $-Z_b-$ linking radical or directly with the

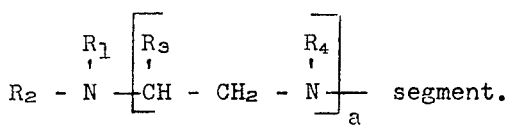

segment.

Because of this, polymerization is conducted in the presence of from .01% to about 10% (by weight) of a free radical initiator which not only induces polymerization but also introduces a terminal functional group into the resulting polymer molecule.

Illustrative of such free radical polymerization initiators are 4,4'-azobis-4-cyanopentanoic acid
4,4'-azobis-4-cyanopentanoyl chloride
4,4'-azobis-4-cyanopentanol
and
bis(1-hydroxycyclohexyl) peroxide.

HS—CH$_2$CH$_2$OH

HS—CH$_2$COOH and

HS—CH$_2$CH$_2$COOH.

Polymerization can be carried out using conventional solution, emulsion, bead or bulk polymerization methods. Solution polymerization is preferred.

In the preferred method, polymerization is conducted in a solvent such as toluene, benzene, acetone, ethyl acetate, tetrahydrofuran, or mixtures of these. The monomer concentration in the solvent can range from 5% by weight to about 100%, preferably 20–30%. The polymerization temperature can range from about 25° C. to about 150° C. Polymerization is preferably carried out in an oxygen-free atmosphere and is complete in from 1 – 100 hours, usually 3 to 18 hours.

The resulting addition polymer can be reacted directly with the other components of the polymer molecule.

B. Preparation of the Polyethylenimine

Some of the polyethylenimines are available commercially (Diethylene triamine, triethylene tetramine and tetraethylene pentamine are sold by the Commercial Solvents Corporation. Polyethylenimines having average molecular weights of 600–1,200 and 1,800 are sold by the Dow Chemical Company as "Montrek" resins.) and can be used directly, without processing.

Those polyethylenimines which cannot be obtained commercially can be prepared according to the general equation

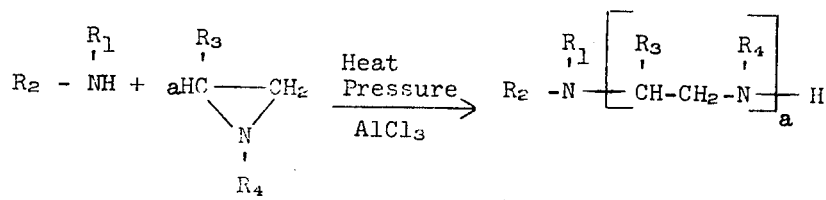

The addition polymer bearing the functional group can also be prepared by conducting the polymerization in the presence of 0.1 – 10%, preferably 0.5%, of a suitably substituted chain transfer agent and the usual amount of a conventional free radical initiator such as benzoyl peroxide or azobisisobutyronitrile.

Illustrative of the chain transfer agents which can be used are

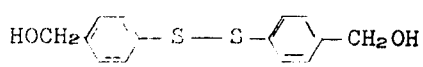

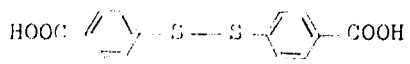

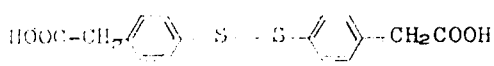

where $R_1$ $R_2$, $R_3$, $R_4$ and $a$ are as in formula (1).

C. Linking the Addition Polymer to the Polyethylenimine

The polymers of the invention are made by coupling together the previously prepared addition polymer and polyethylenimine. If the functional group on the addition polymer can react directly with the polyethylenimine, they can be coupled together by simply mixing stoichiometric amounts of each in a vessel and then holding them at a temperature of 0° to 120° C. for from 1/2 to 4 hours.

If a functional group on the addition polymer cannot react directly with the polyethylenimine, either may be modified by reacting it with an appropriate linking compound so that it will react. Preferably the addition polymer is so modified.

Illustrative of such a reaction (which will introduce a $-Z_b-$ radical into the final molecule) are (1) 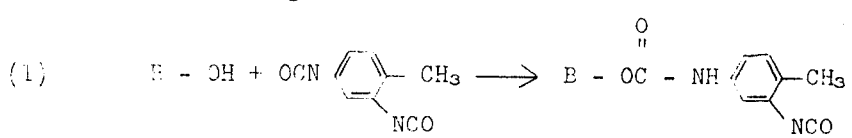

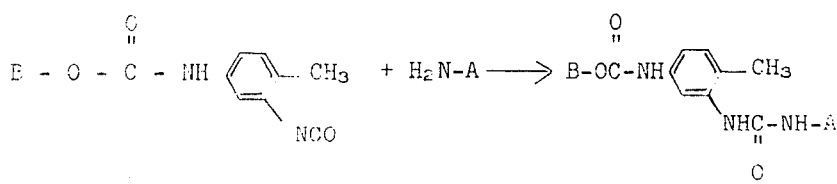

(2) 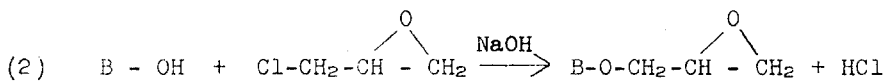

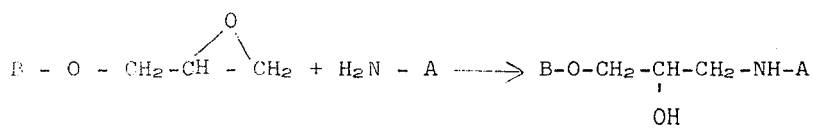

(3) 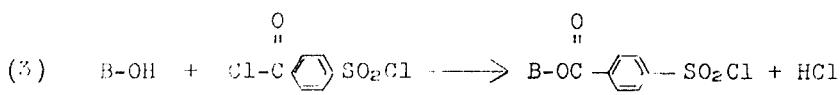

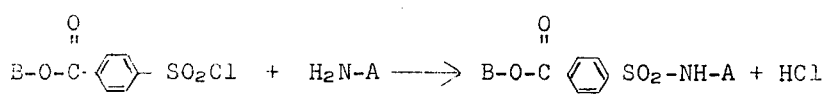

(4) 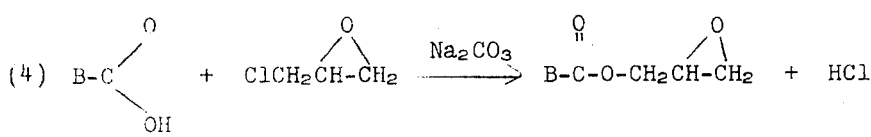

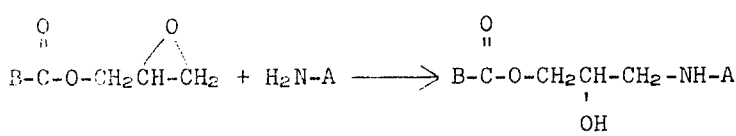

In these equations, B signifies the addition polymer segment and A signifies the polyethylenimine segment.

After one of the precursors has been reacted with the linking compound, the product and the other precursor are dissolved in a mutual solvent such as toluene and refluxed for from 1 to 8 hours.

The polymer of the invention can be isolated from this reaction mass by adding a non-solvent such as methanol. The resulting precipitate is then filtered off and purified by redissolving and precipitating it several times, and then drying it at 60°–100° C. in an inert atmosphere.

The physical properties of the polymers of the invention thus prepared range from viscous liquid to friable solid. The polymers are soluble in common organic liquids such as toluene, ethyl acetate, tetrahydrofuran, acetone, hexane, cyclohexane and dimethylformamide.

PREFERRED EMBODIMENTS OF THE INVENTION

The following examples are submitted so that the invention may be more readily understood and practiced.

Those skilled in the art will no doubt be able to compose numerous variations on their central theme, such as the attachment of innocuous substituents. It is naturally considered that these variations are a part of the invention.

In the examples all parts are by weight unless otherwise indicated.

EXAMPLE 1

To a dry bottle which had been flushed with nitrogen were added 75 parts of methyl methacrylate (filtered through alumina), 150 parts of toluene, 0.75 part of azodiisobutyronitrile, and 0.75 part of 2-mercaptoethanol.

The bottle was capped and placed in a constant temperature bath, where it was held for 18 hours at 70° C. The resulting polymer was precipitated in methanol, collected by filtration and dried at 60° C. under vacuum.

Ten grams of this polymer in 50 parts of benzene were added, under anhydrous conditions over a 1 hour period, to a rapidly stirred refluxing solution of 0.326 part of toluene diisocyanate, 2 drops of dibutyl tin dilaurate and 20 parts of benzene. The resulting solution was then refluxed for 1 hour and cooled.

Eighteen hundredths part of N(2-aminoethyl) aziridine was added to the solution, which was then allowed to stand overnight. Two-tenths part of N,N-dimethyl ethylene diamine was added, the solution refluxed for 2 hours and then cooled.

The resulting solution of polymer having the structure

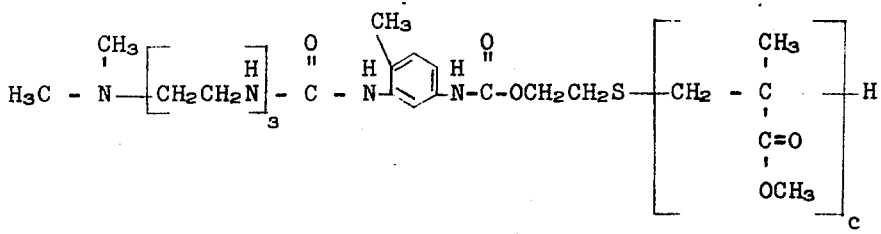

where $c$ is about 50, can be used directly in the preparation of pigment dispersions.

EXAMPLE 2

To a three-neck flask fitted with condenser, stirrer, and nitrogen inlet were charged 200 parts of dry benzene, 75 parts of methyl methacrylate (filtered through alumina) and 2 parts of 4,4'-azobis-4-cyanopentanoyl chloride.

The solution was stirred under a nitrogen blanket and refluxed for 2 hours. It was then cooled and added dropwise to a rapidly stirred solution of 15 parts of "Montrek" 6 (Montrek 6 is polyethylenimine with a molecular weight of about 600, sold by Dow Chemical Company.) (polyethylenimine) and 100 parts of anhydrous dimethylformamide. The resulting solution was stirred for an additional 30 minutes and allowed to stand overnight.

The solution was then reduced to one-half its original volume by heating under vacuum. The polymer was precipitated by pouring it into 2,500 parts of methanol. The precipitated polymer was collected on a filter, dissolved in 100 parts of dimethylformamide and again precipitated by pouring it into 2,500 parts of methanol. The product was isolated by filtering it off and then drying it under vacuum at 60° C. This gave 45.1 parts of polymer having the structure

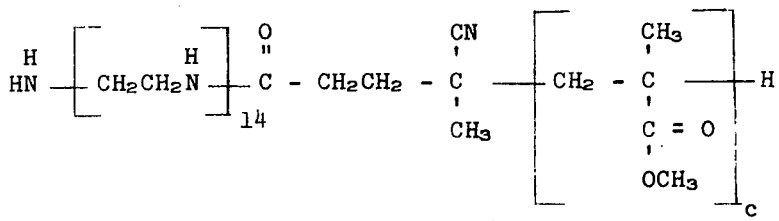

where $c$ is about 500.

EXAMPLE 3

To a dry bottle which had been flushed with nitrogen were added 41 parts of methyl methacrylate, 9 parts of butyl acrylate, 1.5 parts of 4,4'-azobis-4-cyanopentanoyl chloride and 120 parts of toluene.

The bottle was capped and placed in a constant temperature bath, where it was held for 18 hours at 70°C. The resulting polymer solution was cooled to room temperature, transferred to a reaction flask and 0.90 part of N(2-aminoethyl)aziridine was added under anhydrous conditions. After the solution had been stirred for 2 hours at room temperature, 1 part of N,N-dimethylethylenediamine was added and the solution refluxed, with stirring, for 3 hours. The solution was then cooled to room temperature to give a solution of polymer having the structure

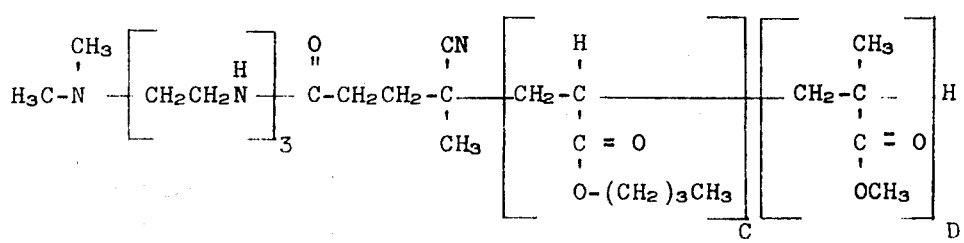

where C + D is about 500 and the addition polymer segment is a random copolymer.

EXAMPLE 4

A solution of 2.5 parts of 4,4'-azobis-4-cyanopentanoyl chloride, 25 parts of anhydrous benzene and 90 parts of butyl acrylate was added over a 1 hour period to 208 parts of refluxing anhydrous benzene.

This solution was then refluxed in a nitrogen atmosphere, with stirring, for 3 hours. The solution was cooled and added to 10 parts of triethylenetetramine in 100 parts of dry benzene, with vigorous stirring, at room temperature. The resulting polymer was precipitated in methanol and dried in a vacuum oven. It had the structure

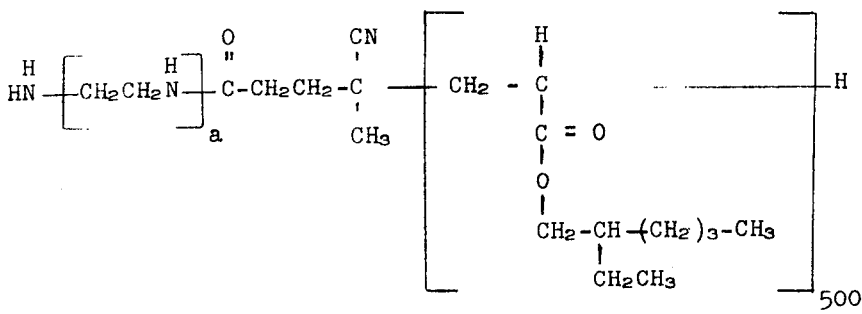

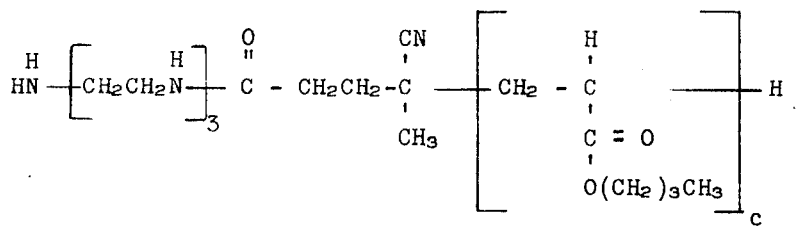

where c is about 500.

EXAMPLE 5

A flask fitted with a stirrer, nitrogen inlet and condenser drying tube was charged with 90 parts of 2-ethylhexyl acrylate (filtered through alumina), 1.5 parts of 4,4'-azobis-4-cyanopentanoic acid, 1.5 parts of 2-mercaptoacetic acid and 207 parts of benzene. The solution was stirred and refluxed under nitrogen for 4 hours.

The resulting solution was poured into 3,000 parts of methanol to pricipitate the polymer, which was isolated by filtering it and then drying it in vacuum desiccator over concentrated sulfuric acid.

A mixture of 10 parts of this polymer and a 10 mol excess of thionyl chloride were refluxed for 24 hours. The excess thionyl chloride was then removed by distillation under reduced pressure.

The resulting polymeric acid chloride was then dissolved in 60 parts of dry benzene and divided into two equal portions. One portion (A) was added dropwise to a solution of 5 parts of triethylenetetramine in 50 parts of benzene; the other portion (B) was added to 20 parts of Montrek 6.

The resulting polymers were isolated from solution by precipitating them from methanol and then drying them at 60° C. under vacuum.

The polymers had the structure where a is 3 for (A) and 14 for (B).

EXAMPLE 6

A solution of 1.5 parts of 4,4'-azobis-4-cyanopentanoyl chloride in 90 parts of vinyl acetate was added, dropwise over a 30-minute period and under a nitrogen blanket, to 200 parts of stirred refluxing benzene. After addition, the solution was refluxed for an additional 2 hours and then cooled to room temperature.

The resulting polymer solution was then added over a 30-minute period to 15 parts of triethylenetetramine in 50 parts of benzene, at room temperature. This reaction mixture was stirred for 30 minutes.

The resulting polymer was purified by precipitation from anhydrous ether and then dried at 60° C. under vacuum in a nitrogen atmosphere.

The polymer had the structure

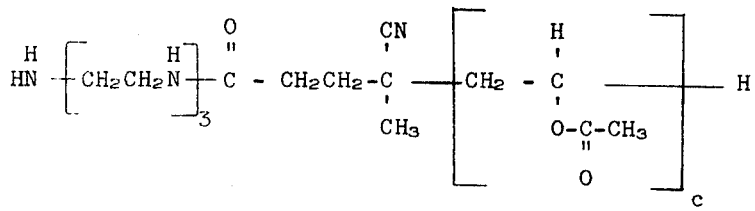

where c is about 500.

EXAMPLE 7

To a dry bottle which had been flushed with nitrogen were added 45 parts of styrene (distilled), 0.23 part of 4,4'-azobis-4-cyanopentanoyl chloride and 104.8 parts of toluene. The bottle was capped and placed in a constant temperature bath, where it was held for 15 hours at 70° C.

The resulting polymer solution was added over a 30-minute solution of 3 parts of triethylene tetramine in 30 parts of toluene, at room temperature.

The resulting polymer was isolated by precipitating it in methanol and then drying it at 60° C. under vacuum.

The polymer had the structure

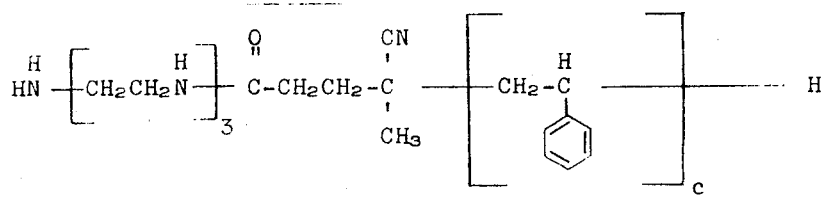

where $c$ is about 200.

EXAMPLE 8

To a flask were added 300 parts of anhydrous diethyl ether, 67.6 parts of polyisobutylene (molecular weight about 2,700) and 4.5 parts of silver cyanate. These materials were stirred into a slurry which was then cooled in an ice bath.

Seven and six-tenths parts of iodine were added, whereupon the solution turned dark brown and a yellow precipitate formed. The mixture was stirred and re- The tube was opened and unpolymerized vinyl chloride removed by distillation.

B. A flask was charged with 8.6 parts of N-(2-aminoethyl)aziridine, 17.2 parts of N,N-dibutylethylenediamine and 100 parts of anhydrous dimethylformamide. The solution was refluxed under an anhydrous nitrogen atmosphere for 4 hours.

This solution was then distilled under reduced pressure to remove solvent and unreacted starting material, leaving the product, N,N-dibutyltriethylenetetramine, as a slightly yellow liquid.

C. To 2.44 parts of the N,N-dibutyl triethylenetetramine in 30 parts of dimethylformamide was added solution (A), over a period of 30 minutes, at room temperature. The solution was stirred for an additional 1 hour and the resulting polymer then isolated by precipitation in methanol.

The polymer thus isolated was then dried in a vacuum oven at 60° C. It had the structure

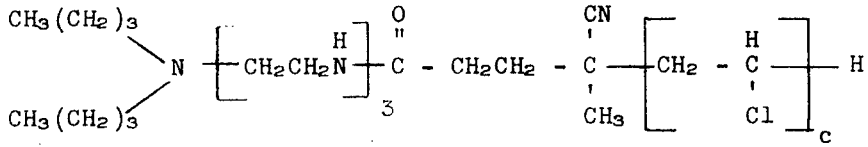 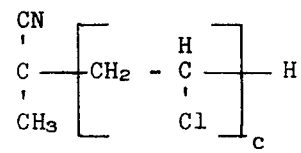

where $c$ is 50–500.

EXAMPLE 10

To a polymer tube were added 25 parts of cyclohexane, 0.30 part of 4,4'-azobis-4-cyanopentanoyl chloride and 5 parts of vinyl acetate. The solution was degassed to remove oxygen and then cooled to about −40° C. with a dry ice-acetone mixture. Ten parts of fluxed for 2 hours, cooled and then filtered.

The solution was then added over a 30-minute period to a refluxing solution of 100 parts of anhydrous diethyl ether and 40 parts of triethylenetetramine. Refluxing was continued for 3 hours and the solution was then cooled.

The resulting polymer was isolated by precipitating it twice from methanol and then drying it under vacuum at 60° C. for 24 hours.

The polymer had the structure

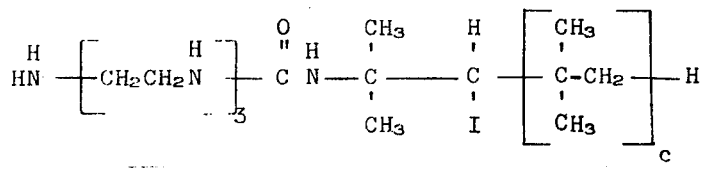

where $c$ is about 50.

EXAMPLE 9

A. To a polymer tube were added 25 parts of cyclohexane and 0.30 part of 4,4'-azobis-4-cyanopentanoyl chloride. The solution was degassed to remove oxygen and cooled to about −40° C. with dry ice-acetone mixture.

Fifteen grams of vinyl chloride were condensed in the tube, care being taken to avoid contamination with oxygen and water. The tube was sealed and allowed to warm to room temperature, then placed in a constant temperature bath at 55° C. and held there for 36 hours.

vinyl chloride were then condensed in the tube, which was then sealed.

The polymerization was run in a constant temperature bath at 55° C. for 36 hours. The tube was then opened and the solution inside was slowly added to 5 parts of poly(N-methyl propylenimine) (molecular weight 710) in 50 parts of anhydrous dimethylformamide, over a 30-minute period, at room temperature. The reaction mixture was stirred for an additional hour at room temperature. The resulting polymer was isolated by precipitating it in methanol and was then dried in a vacuum at 60° C.

The polymer had the structure

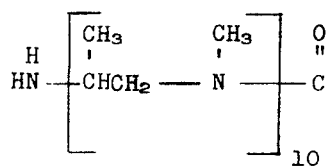
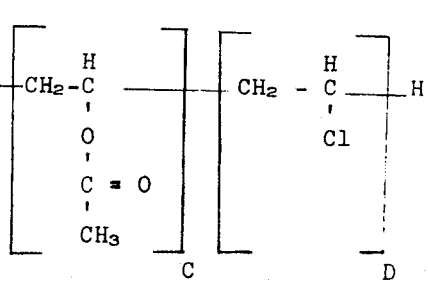

C + D is about 50 and the addition polymer segment is a random copolymer.

EXAMPLE 11

To 208 parts of refluxing benzene were added, over a one-hour period and under a nitrogen atmosphere, 90 parts of VV 10 (VV 10 vinyl monomer is the vinyl ester of a saturated tertiary 10 carbon atom carboxylic acid sold by the Shell Chemical Company.) vinyl monomer containing 1.5 parts of 4,4'-azobis-4-cyanopentanoyl chloride. The solution was then refluxed for another 5 hours and cooled.

One portion was added to a solution of 10 parts of triethylenetetramine in 40 parts of anhydrous benzene.

The solution was then poured into methanol to precipitate the resulting polymer, which was filtered off and dried in a vacuum oven at 60° C.

I claim:

1. A polymeric material of the formula

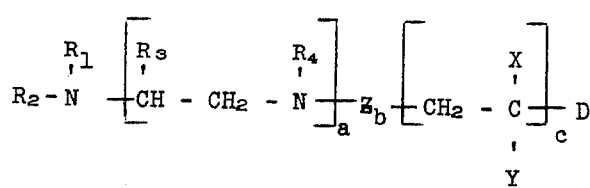

where
$R_1$, $R_2$ and $R_4$ are hydrogen or alkyl radicals of 1 through 4 carbon atoms,
$R_3$ and X are hydrogen or alkyl radicals of 1 through 4 carbon atoms;
$Z_b$ is a

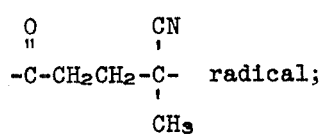

radical;
Y is an alkyl radical of 1 through 4 carbon atoms, halogen,
or $$-O-\overset{O}{\underset{\|}{C}}-R,$$

$$-\overset{O}{\underset{\|}{C}}-OR$$

where
R is an alkyl radical of one through 18 carbon atoms;
D is hydrogen;
$a$ is a number 1 through 2000;
$b$ is 0 or 1;
and
$c$ is a number 5 through 5000;
the $c/a$ quotient being greater than 1.

2. The polymeric material of claim 1 wherein
$a$ is a number 3 through 100,
and
$c$ is a number 20 through 500.

3. The polymeric material of claim 2 having the formula

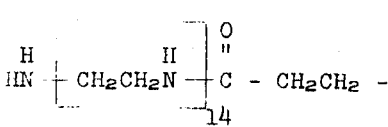
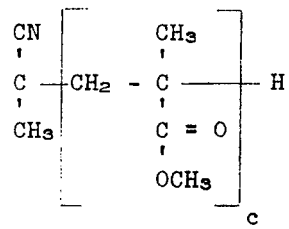

where $c$ is about 500.

4. The polymeric material of claim 2 having the formula

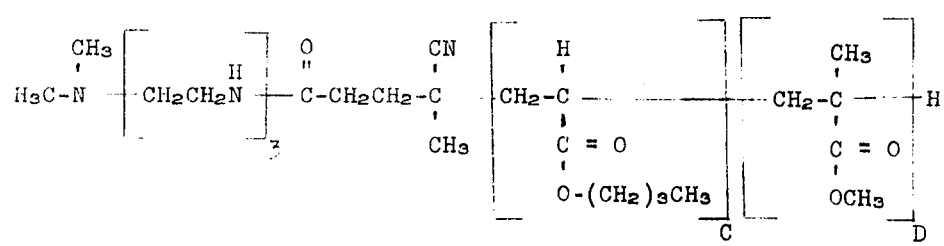

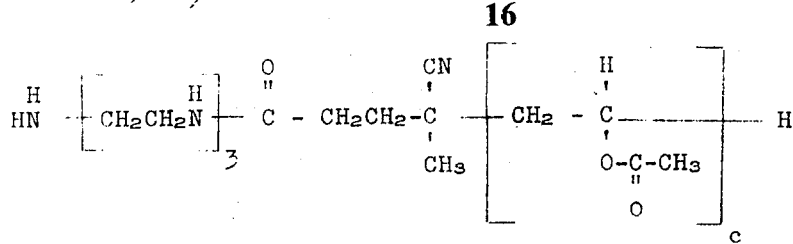

where C + D is about 500 and the addition polymer segment is a random copolymer.

5. The polymeric material of claim 2 having the formula where c is about 500.

8. The polymeric material of claim 2 having the formula

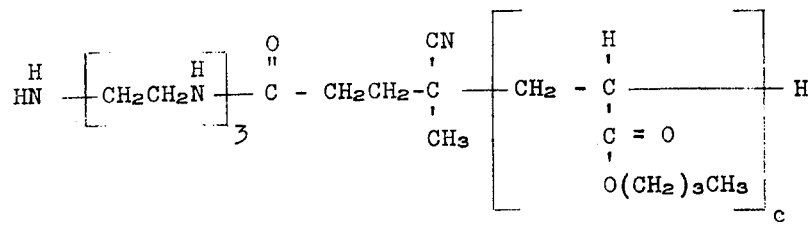

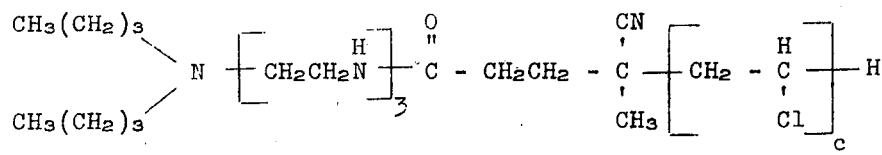

where c is about 500.

6. The polymeric material of claim 2 having the formula where c is 50–500.

9. The polymeric material of claim 2 having the formula

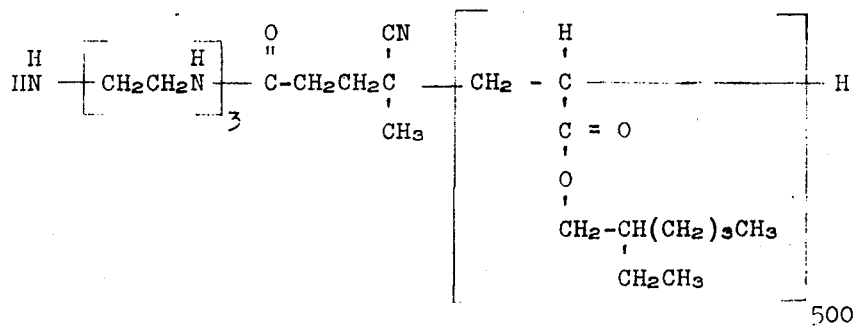

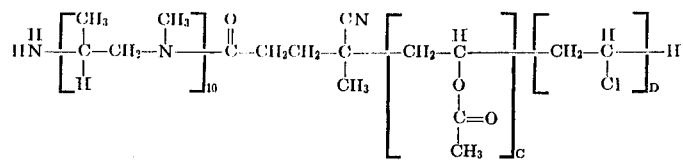

7. The polymeric material of claim 2 having the formula

C + D is about 50 and the addition polymer segment is a random copolymer.

* * * * *